(12) United States Patent
Gruber et al.

(10) Patent No.: US 7,735,093 B2
(45) Date of Patent: Jun. 8, 2010

(54) METHOD AND APPARATUS FOR PROCESSING REAL-TIME COMMAND INFORMATION

(75) Inventors: Andrew E. Gruber, Arlington, MA (US); Stephen L. Morein, Cambridge, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1652 days.

(21) Appl. No.: 10/791,519

(22) Filed: Mar. 2, 2004

(65) Prior Publication Data

US 2005/0210172 A1 Sep. 22, 2005

(51) Int. Cl.
G06F 9/44 (2006.01)
G06F 13/00 (2006.01)
G06F 15/173 (2006.01)

(52) U.S. Cl. .................. 719/318; 710/100; 709/224

(58) Field of Classification Search ......... 719/310–312, 719/318, 323; 709/217–219, 223–224, 225; 710/8, 263, 52, 53, 56, 100, 310
See application file for complete search history.

(56) References Cited

U.S. PATENT DOCUMENTS

| | | | | |
|---|---|---|---|---|
| 5,315,696 A | * | 5/1994 | Case et al. | 345/522 |
| 5,321,828 A | * | 6/1994 | Phillips et al. | 703/28 |
| 5,327,558 A | * | 7/1994 | Burke et al. | 710/8 |
| 5,502,462 A | * | 3/1996 | Mical et al. | 345/553 |
| 5,937,202 A | * | 8/1999 | Crosetto | 712/19 |
| 6,205,524 B1 | * | 3/2001 | Ng | 711/151 |
| 6,263,396 B1 | * | 7/2001 | Cottle et al. | 710/263 |
| 6,518,965 B2 | * | 2/2003 | Dye et al. | 345/419 |
| 6,763,176 B1 | * | 7/2004 | Trottier et al. | 386/52 |
| 6,788,309 B1 | * | 9/2004 | Swan et al. | 345/629 |
| 6,862,708 B1 | * | 3/2005 | Higginbotham et al. | 715/500 |
| 6,866,585 B2 | * | 3/2005 | Muir | 463/31 |
| 7,053,863 B2 | * | 5/2006 | Glen et al. | 345/2.3 |
| 7,222,347 B2 | * | 5/2007 | Kardach | 719/318 |
| 7,379,999 B1 | * | 5/2008 | Zhou et al. | 709/224 |
| 2003/0140179 A1 | * | 7/2003 | Wilt et al. | 709/321 |
| 2004/0070594 A1 | * | 4/2004 | Burke | 345/716 |
| 2005/0183143 A1 | * | 8/2005 | Anderholm et al. | 726/22 |

* cited by examiner

*Primary Examiner*—Van H Nguyen
(74) *Attorney, Agent, or Firm*—Michael J. DeHaemer

(57) ABSTRACT

A method and apparatus includes a real time event engine that monitors event signals. A real time event detector within the real time event engine detects when the real time event occurs. Thereupon, real time event commands within a real time event command buffer are fetched and consumed by the command processor in response to the occurrence of the real time event. The real time event detector contains a plurality of control registers, which contain an event selector register, a real time command buffer point register, and a real time command buffer length register. A driver may program the registers, whereupon a singe real time event detector may be used in conjunction with a plurality of real time event command buffers.

19 Claims, 6 Drawing Sheets

METHOD AND APPARATUS FOR PROCESSING REAL-TIME COMMAND INFORMATION

FIELD OF THE INVENTION

The invention relates generally to command processor operations and more particularly to the insertion of a real time command stream to the command processor upon the occurrence of a designated real time event.

BACKGROUND OF THE INVENTION

Computers are known to include a central processing unit (CPU), main memory, interconnecting buses, and video graphics circuitry. The tasks that a computer can process have increased proportionally with the increase in processing power and memory storage capabilities. Furthermore, as the number of tasks increase, systems are required to operate more quickly and efficiently, including the manner in which processing commands are transmitted and executed within the system.

When a command processor receives system commands from a command buffer, the processor provides these commands to be executed by the specific engines, such as a video rendering engine, a direct memory access (DMA), or a display device. The command buffer usually acts within a first-in first-out (FIFO) order. Therefore as a new command is provided from a host, all previous commands already within the buffer must be processed before the new command is executed.

A problem arises when a specific command needs to be executed, at a specific time or in relation to another executed command. Often times, when a specific command or external event occurs, the system will seek to execute a related command usually related to the previous command or the external event. In a conventional command processing system, the first-in first-out processing steps prevent the related command from being processed until all other commands within the queue or buffer are executed.

To overcome the problem of a specific command needing to be executed within a specific time, typically, systems have been developed having multiple command buffers having variant priority levels. Within the multiple priority buffer system, a specific command can be labeled with a priority tag. The priority tag then determines from which command buffer the command processor receives the processing command. For example, the system may choose to execute all high priority commands when the system processor determines the system is operating at a peak state, and then may choose to execute the low priority commands when the system is more capable to execute the lower priority commands. The multiple priority command buffer systems fail to provide for the synchronization of multiple events, the system must choose to execute low or high priority events, but cannot synchronize the occurrence of a specific high priority event with a specific low priority event or multiple high priority or low priority events.

In an attempt to provide synchronization between multiple commands, another solution is the insertion of a wait-until step within the command processing system. Typically, these systems will execute a specific command, and then stall the command processor until a specific event occurs. A problem occurs when a command processing unit is subject to a wait-until command, the processing system is essentially stalled until the event occurs, thus creating an inefficient processing system and can thereby substantially reduce the speed of the processing system. As such, synchronization may be achieved, but at the cost of processing efficiency.

Moreover, typically this system can only handle a single specific synchronization through the execution of multiple commands, at one time. Therefore, the processing system is extremely limited when multiple wait-until event scenarios arise.

Consequently, there exist a need for a command processing system whereupon the occurrence of multiple events may be properly synchronized without reducing system efficiency.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a system and method processes command information by detecting a real-time event and causing commands in a real-time event command buffer to be fetched and consumed in response to the real-time event. A command processor receives the system processing command from a system command buffer, where the commands are processed and provided to a specific engine, such as a two-dimensional graphics engine. A real-time event engine monitors a plurality of event signals, such as timing pulses from a timer, a notification that a full frame has been captured, or any other event associated with the computing system, generated by both the engines that receive the system commands and by other sources, monitoring for a specific real-time event. In some cases the monitoring may involve polling a register elsewhere, waiting for a specific change of the register. A real-time event command buffer contains a plurality of real-time event commands, wherein the real-time event commands are fetched and consumed by the command processor when the real-time event is detected.

The real-time event engine includes a real-time event detector that has an event table containing an event selector. The real-time event detector also contains a comparator that receives the event selector and the event signals. When the comparator determines that an event signal matches an event selector, an event detection signal is produced. The event detection signal causes the real-time event commands within the real-time event command buffer to be provided to the command processor whereupon the command processor then provides these commands to a designated engine to be properly executed. Thereby, the real-time event engine provides for the synchronization of processing commands upon the occurrence of a real time event, without requiring the system to be stalled within a wait-until situation.

Figure 1:
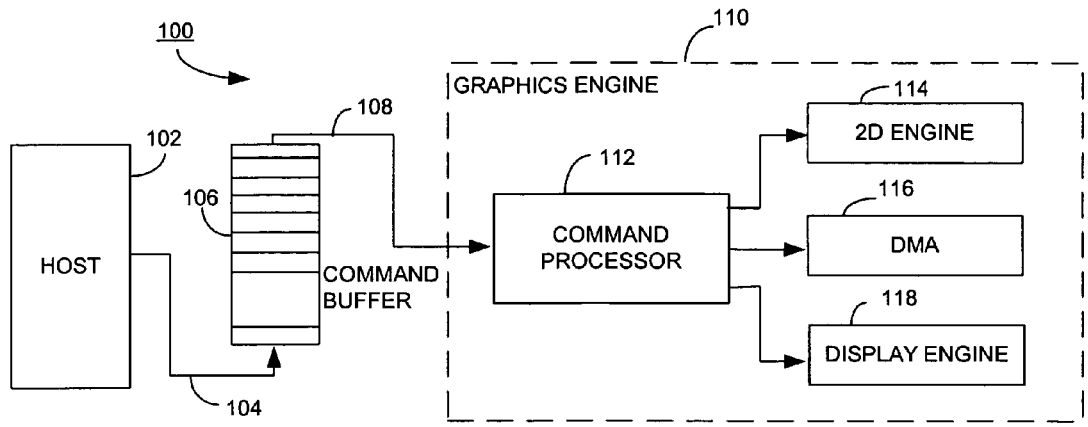
FIG. 1 illustrates a schematic block diagram of a prior art command processing unit.

Referring now to FIG. 1, a prior art command processing system is illustrated. The system 100 includes a host 102 providing an input command 104 to a command buffer 106. The command buffer 106 then forwards a topmost command 108 to a graphics engine 110. The graphics engine 110, which receives and renders graphics for display, contains a command processor 112 operably coupled to a two-dimensional graphics engine 114, a DMA 116, and a display engine 118. The command processor receives the command 108 from the command buffer 106 and provides this command to one of the engines. Whereupon, the engine may then execute the command, as needed.

The prior art processing system of FIG. 1 illustrates a first-in, first-out command buffer 106. This system is severely limited in that when a new command 104 is fed into the buffer, the topmost command 108 is then provided to the command processor 112. In the situation where the host 102 would like a command 104 to be executed immediately, all of the commands within the command buffer 106 must first be executed by the command processor 112, thus limiting the processing system's ability to execute a specific command upon the occurrence of a specific event.

Figure 2:
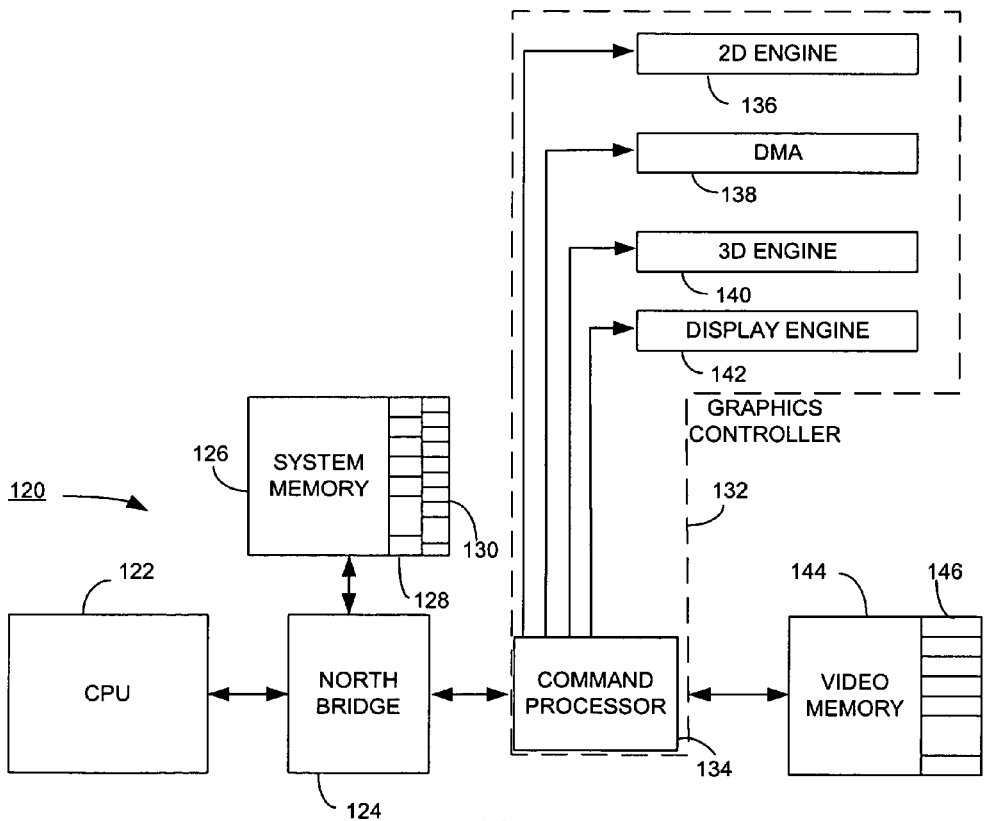
FIG. 2 illustrates a schematic block diagram of a prior art command processing system having multiple priority command buffers.

FIG. 2 illustrates a graphical representation of a prior art processing system 120 having multiple priority buffers. The system 120 consists of a central processing unit (CPU) 122 operably coupled to a north bridge 124. The north bridge 124 is further coupled to the system memory 126 having a low priority buffer 128 and a high priority buffer 130. The north bridge 124 is further operably coupled to a graphics controller 132 which consists of a command processor 134 and a plurality of engines, such as a two-dimensional engine 136, a DMA 138, a three-dimensional engine 140, and a display engine 142. For the sake of clarity, all other elements within the graphics controller have been omitted. Furthermore, the graphics controller 132 is operably coupled to a video memory 144 having a buffer 146 contained therein.

When the CPU 122 seeks to execute a command, the command is provided to the north bridge 124. The north bridge 124 then accesses the system memory 126 where the command is then placed either in the low priority buffer 128 or the high priority buffer 130 based on a specific designation. The north bridge 124 then provides this information within either the high priority buffer 130 or the low priority buffer 128, depending on which buffer is being accessed, to the graphics controller 132, specifically the command processor 134. Whereupon, the command processor 134 then provides the command to the specific engine to which it is so directed.

The system of FIG. 2 can further access command information through the video memory 144 and commands within the command buffer 146 therein. The system provides for the execution of various commands based on the priority level of each command. However, the system of FIG. 2 typically cannot provide any form of synchronization between multiple executable commands, regardless of the command priority level.

Figure 3:
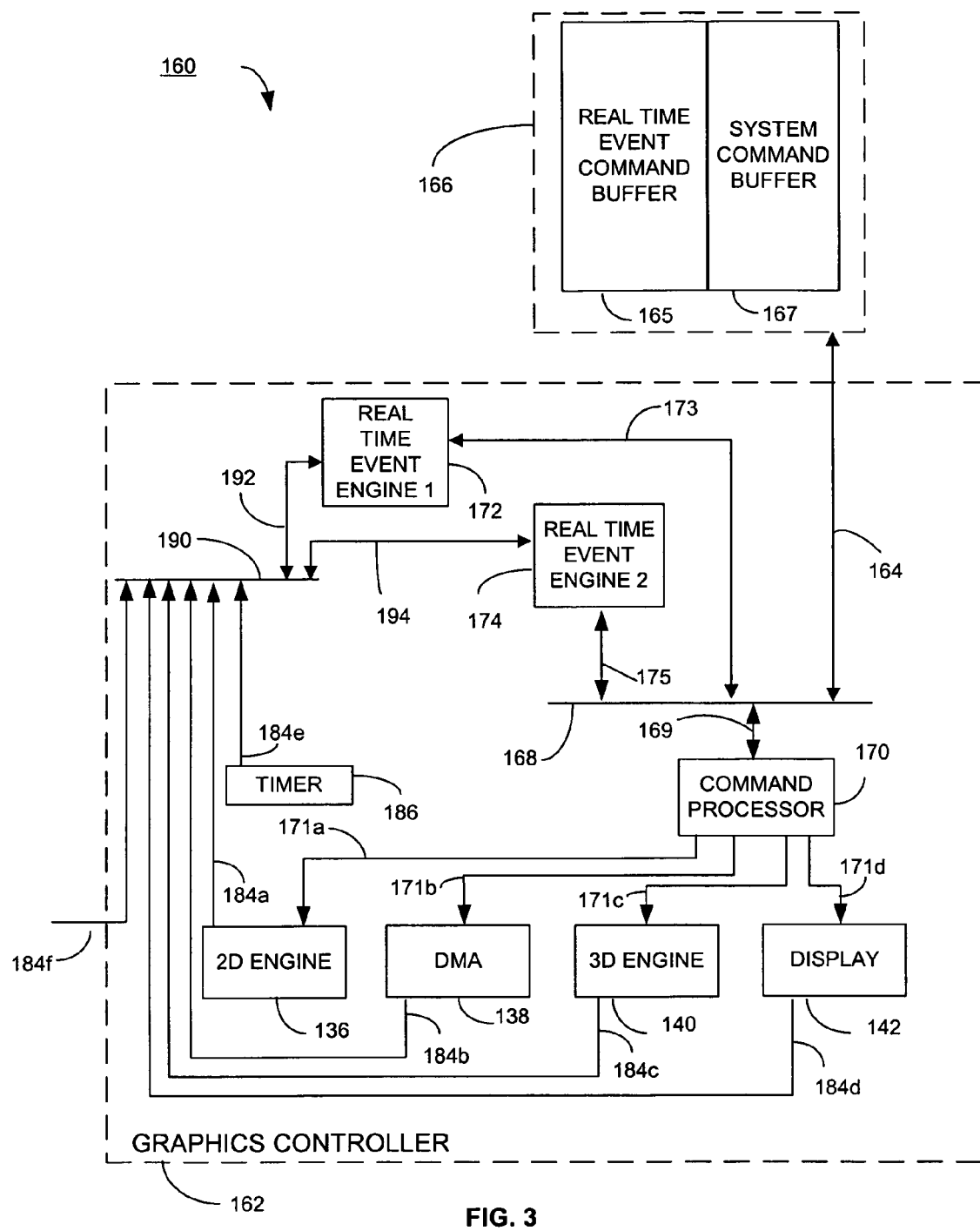
FIG. 3 illustrates a schematic block diagram of a command processing system in accordance with one embodiment of the present invention.

The present invention is more fully described with reference to FIG. 3 through FIG. 9. FIG. 3 illustrates one example of a processing system 160 in accordance with the present invention. The processing system 160 includes a graphics controller 162 which receives system commands 164 from a system memory 166 having a real time event command buffer 165 and a system command buffer 167. These buffers may be ROM, RAM, virtual memory, or any other suitable buffer. The system commands are provided to a bus 168 via connection 164, whereupon the bus 168 provides the fetched command 169 to the command processor 170. The command processor 170 is operably coupled to and provides the command to one of a plurality of engines designated at 136-142, via connection 171a-171d, respectively.

The graphics controller 162 includes a two-dimensional engine 136, such as the ATI Radeon® graphics accelerator developed by ATI Technologies, Inc., 33 Commerce Valley Drive East, Thornhill, Ontario, Canada, a DMA 138, a 3D engine 140 such as may be found in the ATI Radeon® graphics accelerator, developed by ATI Technologies, Inc., 33 Commerce Valley Drive East, Thornhill, Ontario, Canada, and a display 142, such as a video monitor. For clarity purposes, other elements, as recognized by those skilled in the art, are not illustrated within the graphics controller 162.

The graphics controller 162 also contains a plurality of real-time event engines, such as a first real-time event engine 172, and a second real-time event engine 174 operably coupled to the bus 168, designated at 173, 175 and 177 respectively. The first real-time event engine 172 and the second real-time event engine 174 are operably coupled to the real-time event command buffer 165 via the bus 168 and path 164.

The command processor 170 processes the system commands from the system command buffer 167. As the system commands are provided to the command processor 170 via the bus 168, the real-time event engines 172 and 174 monitor event signals 184a-184f, generated by not only the engines 136-142, but other sources such as a timer 186 or an external input source, designated at 184f. The real time event engines, 174 and 176, monitor for a specific real time event. The event signals 184a-184f represent various events occurring within the system, for example timing information (184e), the capturing of a full frame of video by the display 142 (184d), the rendering of an object within the 3D engine 140 (184c), or any other events as recognized by one of ordinary skill in the art. The real time event signals, 184a-184f, are provided to a bus 190 whereupon the first real time event engine 172 reads the event signals via connection 192 and the second real time event engine 174 reads the event signals via connection 194.

The real time event engines may include one or more machines designed to actively poll memory or register locations, looking for specific values or changes. This allows the use as triggers events that may not have been intended for such use.

Moreover, the real time event engines, 172 and 174, are coupled to the real time event command buffer 165 which contains real time events commands that are processed by the command processor 170 when the real time event is detected. As recognized by one of ordinary skill in the art, the specific location of the real time event command buffers may be in various locales, as long as the commands within the one embodiment, real time event command buffer may be provided to the command processor but the real time event command buffer 165 is disposed in the system memory 166.

When one of the real-time event engines, 172-176, detects a specific real-time event, the corresponding real-time event commands are provided to the command processor 170, via data bus 168. For example, if the event signal 184a is the same event for which the first real-time event engine 172 is monitoring, the engine 172 accesses the real-time event command buffer 165 via bus 168. The engine 172 then provides the real-time event commands to the command processor 172 to be executed by at least one of the operably attached engines 136-142. Moreover, the system commands from the system command buffer 167 are not received by the command processor 170 as long as the real-time event command buffer 165 is being accessed by the processor 170, in effect pausing the execution of the system commands to fully execute all of the real time event commands.

Figure 4:
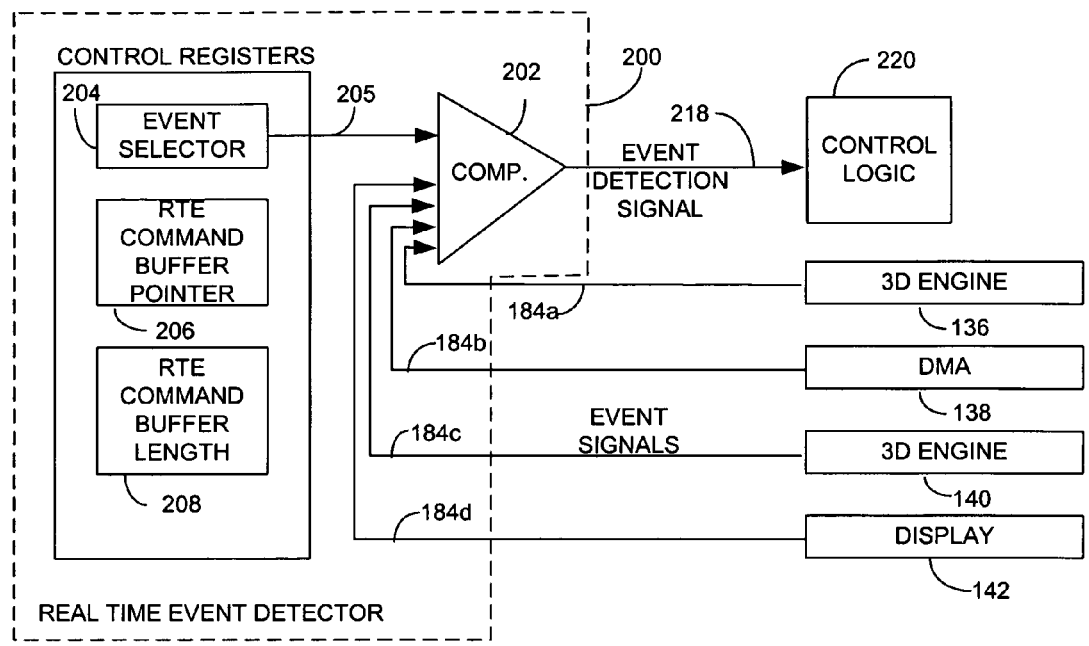
FIG. 4 illustrates a schematic block diagram of a real time event detector, in accordance with one embodiment of the present invention.

FIG. 4 illustrates a schematic block diagram of the command processing system having a real-time event detector. A real-time event detector 200 is disposed within a real-time event engine, such as the first real-time event engine 172 of FIG. 3. The real-time event detector 200 includes a comparator 202 and a plurality of control registers. The first control register, the event selector register 204, contains an event selector, which is the real-time event for which the real-time event detector is monitoring. The second register contains the real-time event command buffer pointer 206, which is an address field pointing to the specific real-time event command buffer. For example, in FIG. 3 the first real-time event engine 172 points to the first real-time event command buffer 178. The third register 208 contains a real-time event command buffer length indicating the length or number of commands within the real-time event command buffer.

The plurality of engines, 136-142, receive processing commands from the command processor via a data bus, not shown. The engines 136-142 produce event signals 184a-184d that are provided to the comparator 202 of the real time event detector 200. As illustrated in FIG. 3, the event signals 184a-184d can also be provided from sources other than the engines 136-142, such as timer or a co-processor, but for the sake clarity the other sources have been omitted.

The comparator 202 of the real-time event detector 200 receives the plurality of event signals 184a-184d and the event selector 204, via path 205. When an event signal 184 matches an event selector, indicating that the desired real-time event has occurred, the real-time event detector 200, more specifically the comparator 202, produces an event detection signal 218 which is provided to control logic 220. The event detection signal 218, in one embodiment, contains the real-time event command buffer pointer 206 and the real-time event command buffer length 208. The control logic 220 then accesses the real-time command buffer as indicated by the real-time event command buffer pointer 206 and retrieves, providing to the command processor, the real time event commands as indicated by the real-time command buffer length 208.

Figure 5:
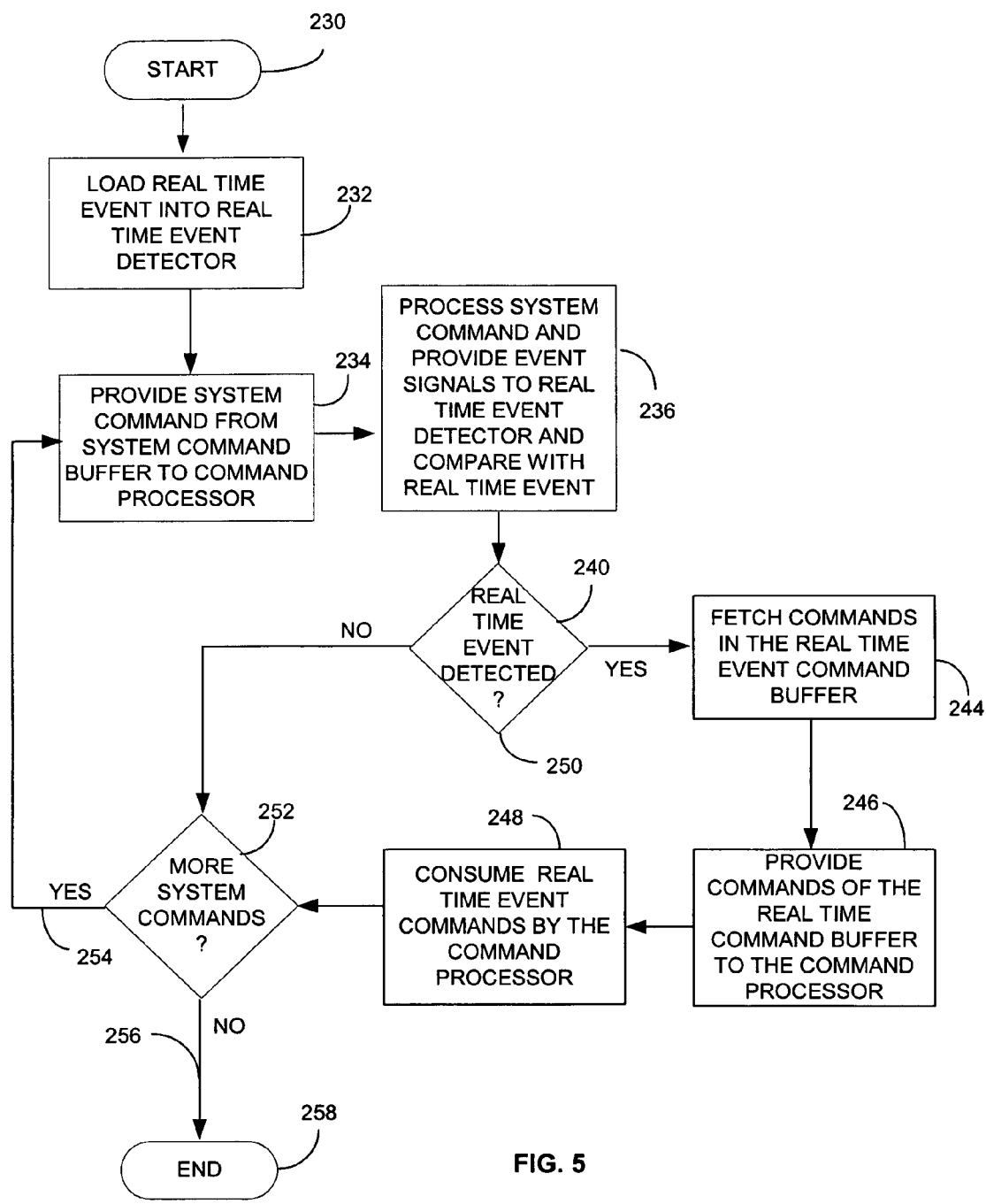
FIG. 5 illustrates a flow chart representing the steps for the processing of command information in accordance with one embodiment of the present invention.

FIG. 5 illustrates one example of a method for processing command information, as referenced with FIG. 4. The process begins, 230, by loading a real-time event into a real-time event detector 200, designated at step 232. In one embodiment of the invention, the control registers, event selector 204, real-time event command buffer pointer 206 and real-time event command buffer length 208, may be loaded through a separate software driver executable by the host processor or other suitable processing circuitry. As described in FIG. 4, the event selector 204 is provided to the comparator 202 via connection 205, such that the real-time event has been fully loaded into a real-time event detector 200.

Next, system commands are provided to the command processor 170 from the system command buffer via a central bus, designated at step 234. The command processor processes the commands and provides them to the appropriate engine, 136-142. Upon execution of a command, the engine produces an event signal 184, consisting of a representation of the event just encountered by the engine (such as a timing pulse from a timer, an end of captured frame designation, etc.) which is provided to the real time event detector 200 to be compared with the real time event, designated at step 236. When a real-time event is detected, 240, the real-time event detector 200 produces an event detection signal 218 which provides for the real-time commands in the real-time command buffer to be fetched and provided to the command processor, designated at steps 244 and 246. Once the real-time event commands are provided to the command processor, the command processor consumes these events, e.g. providing the command to the dedicated engine, designated at step 248.

Relating back to step 240, should the comparator compare the event signals 184 and determine them incompatible to the event selector 205, a determination must be made as to whether there are more system commands within the command buffer, designated at step 252. Similarly, had a real-time event been detected, 240, once all of the real-time event commands have been consumed by the real-time event command processor, step 248, once again a determination must be made as to whether there are more system commands within the system command buffer, step 252. If there are more commands, 254, the next system command is then provided to the command processor from the system command buffer, designated at step 234. Once all system commands and detected real time event commands have been executed 256, the processing is complete, step 258. In one embodiment, the method further includes waiting for more system commands. Therefore, upon determination of no more system commands at step 252, the system may wait a time-out period to determine if any further system commands are received. If more commands are received, the method reverts back to step 234 for further operations in accordance with the steps discussed above.

Figure 6:
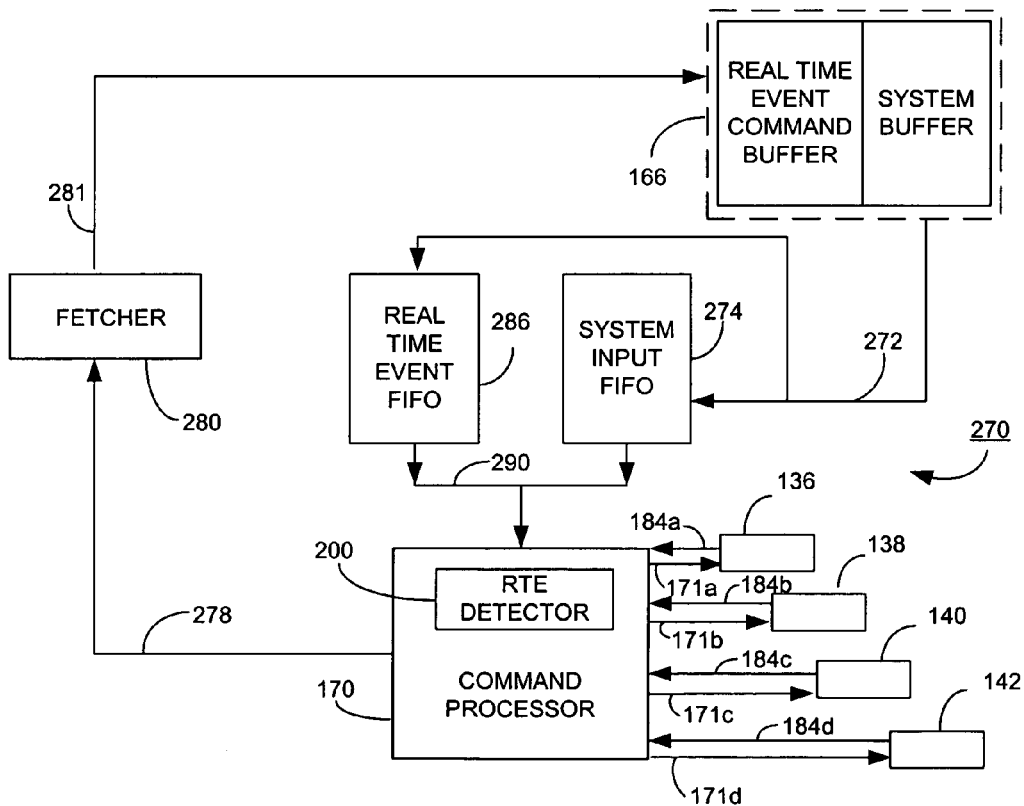
FIG. 6 illustrates a schematic block diagram of a processing system, in accordance with another embodiment of the present invention.

FIG. 6 illustrates another embodiment of the processing system of the present invention. This system, 270, illustrates the real-time event detection and processing from a fetching perspective. The processing system 270 has a system memory 166 containing a real time event command buffer 165 and a system command buffer 167. The system memory 166 provides system commands to a system input FIFO 274 via connection 272. The system input FIFO 274, thereupon, provides the system commands to the command processor 170 via bus 290. Within the command processor 170 the real-time event detector 200 monitors the event signals 184a-184d generated by the engines 136-142. In one embodiment, the command processor 170 consumes the system command by providing it to the appropriate output, such as the 3D engine 140. Thereupon the command processor generates a fetch control signal 278 notifying the fetcher 280 that the command has been processed, further instructing the fetcher to fetch, via path 281, the next system command 272 from the system buffer 167, whereupon the next system command 272 is provided to the system input FIFO 274. Again, the system input FIFO 274 provides the system command 272 to the command processor 170 to be consumed and the command processor 170 once again notifies the fetcher 280. This process continues until either all system commands have been executed or the fetcher is instructed otherwise.

In the event the real-time event detector 200 detects a real-time event, the command processor notifies the fetcher 280 to fetch the commands from the real-time event command buffer 165. The real-time event detector 200 within the command processor 170 is programmed to look for a specific event through loading the appropriate event selector 204 within the comparator 202, as illustrated in FIG. 4.

The command processor output 278 then accesses the real-time event command buffer 165. The fetcher 280 is instructed to fetch the commands within the real-time event command buffer 165 and provide those commands to the real-time event FIFO 286 via path 272. Whereupon the real time event commands are provided, via bus 290, to the command processor 170 to be consumed. As recognized by one of ordinary skill in the art, the bus 290 operably couples the real time event FIFO 286 and the system input FIFO 274 to the command processor 170, but furthermore provides operable coupling for other system elements not illustrated in FIG. 6.

After each specific real-time event command has been consumed, the fetcher 280 is once again instructed to fetch, via connection 281, the next real-time event command within the real-time event command buffer, until all of the real-time event commands have been consumed, i.e. the number of real-time events being consumed by the command processor is equivalent to the real-time event command buffer length 208.

In the embodiment illustrated in FIG. 6, a specific driver may be used to program to the real time event detector 200 with real time event control register information, specifically the event selector 204, real time event command buffer pointer 206 and the real time event command buffer length 208. The system of FIG. 6 may further provide for a system having multiple real time event command buffers providing for a plurality of real time events with corresponding real time event commands programmable to a single real time event detector 200 which may be specifically programmed to detect different events at different times. Moreover, within the scope of the embodiment of FIG. 6, the control registers of the real time event detector 200 may be re-programmed by the designated driver upon the occurrence of a specific event, such as a real time event command buffer containing commands to reprogram the real time event detector upon the occurrence of a specific event. As recognized by one of ordinary skill in the art, the real time event detector 200 may be positioned outside of the command processor 170, as well as resident therein.

Figure 7:
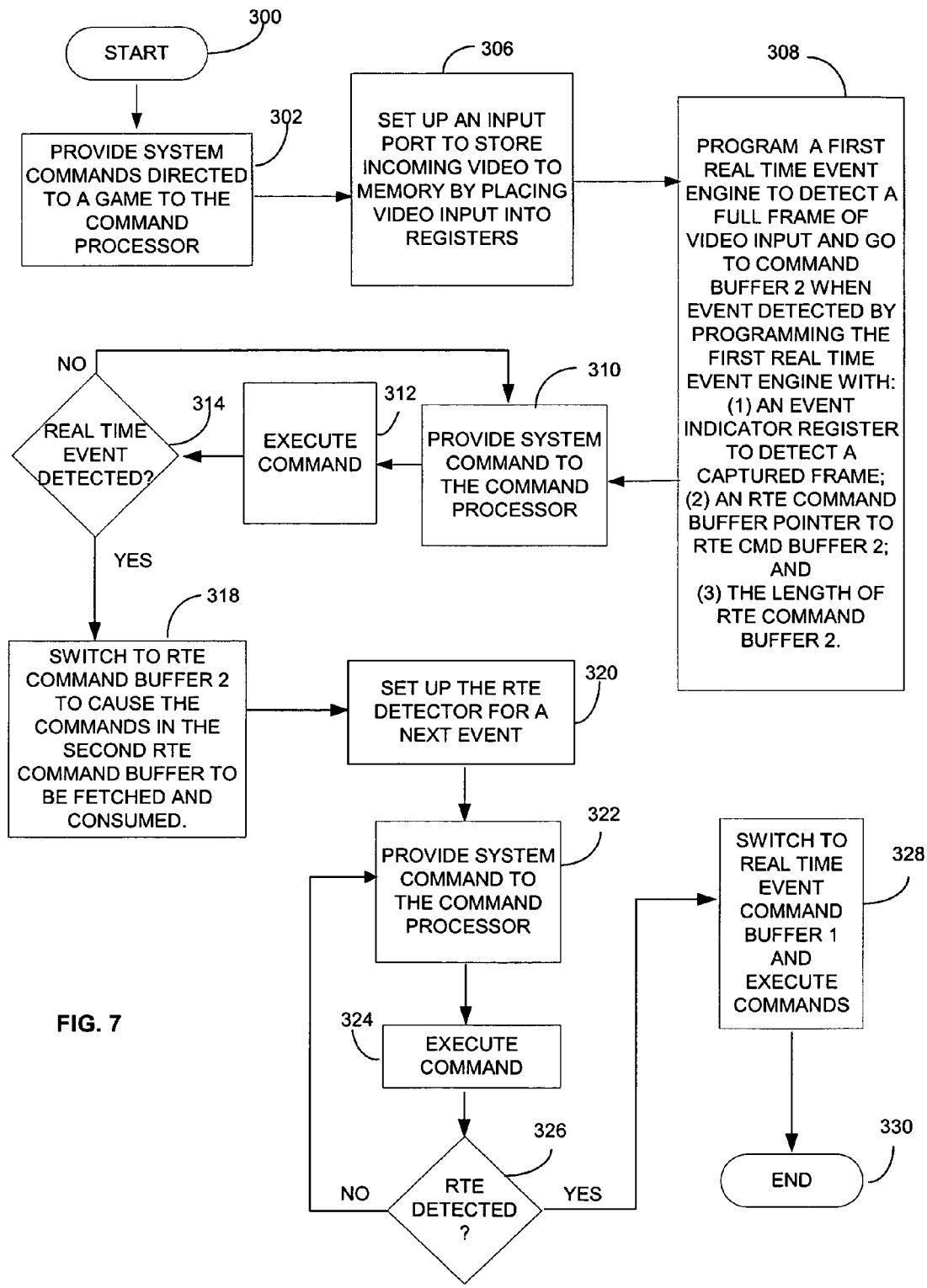
FIG. 7 illustrates a flow chart representing the steps for processing command information, in accordance with one embodiment of the present invention.

FIG. 7 illustrates a method for processing command information, in one embodiment of the present invention. The steps of FIG. 7 illustrate an example when a video display is overlaid a video game display such that both displays are visible with the video game display partially obscured by the video display, wherein an exemplary video display may be a digital versatile disc video output. As the process begins 300, the system receives system commands directed to the video game, of which the command processor is processing system commands 302 and the system receives the video input from a video input port. Once a full video frame has been captured from the video input port, the system must wait for the raster line to be in a vertical synchronization before the video source can be mixed with the game.

Thereupon, the system must set up an input port to store the incoming video from the video source to memory, by placing video input into specific registers 306. The driver then programs a first real-time event engine to detect when a full frame of video is received from the input port and further programs the engine to go to the second command buffer when the event is detected. The event selector within the real-time event detector is programmed to detect a full captured video frame. A real-time event command buffer pointer is then directed to point to a second real-time event command buffer. The length of the second real-time event command buffer must also be programmed into the real-time event detector, designated at 308.

Thereupon, the real-time event engine has been programmed to detect when a full frame of video is received and then provide commands from the second real-time event command buffer to the command processor. Also, the system provides system commands, directed to the underlying video game to the command processor from the command buffer, designated at step 310. The command processor processes the system command to the appropriate engine, such as the DMA, step 312. When the engine executes the system command, the engine generates an event signal, which is provided to the real time event detector such that a determination may be made as to whether a real time event is detected, step 314.

If a real time event has not been detected, another system command is fetched and provided to the command processor, as illustrated in FIG. 6, designated at step 310. If the real time event, a full frame of video is captured, the fetcher, as illustrated in FIG. 6, is instructed to switch to the second real-time event command buffer to cause the commands in the second real-time event command buffer to be fetched and consumed by the command processor, designated at step 318. Once all of the real-time events within the second real-time event command buffer have been fetched and consumed by the command processor, the system then sets up the real-time event detector for the next event, 320, specifically loading a new event selector into the comparator, providing a new real time event command buffer pointer to point to the first real time event command buffer, and provide the real time event command buffer length. In the embodiment of FIG. 7, the second real time event is to determine when the raster line is in vertical synchronization such that the full frame of video can be properly mixed or integrated into the overlay of the video game display.

The real time event detector then provides the next system command to the command processor 322. Whereupon, the system command is executed, step 324. Next, it is determined whether the real time event has been detected, i.e. is the raster in vertical synchronization, step 326. If the real time event is not detected, the next system command is provided to the command processor and executed, steps 322 and 324. If the real time event is detected, the command processor provides for the real time event commands in the first real time event command buffer to be retrieved and executed so that the video frame is properly integrated with the video game display, step 328. Once all the real time event commands have been executed, the process is complete, step 330. Thereupon, the video overlay is properly integrated and displayed in conjunction with the underlying video game, wherein the display provides a complete video image in a frame by frame process.

Figure 8:
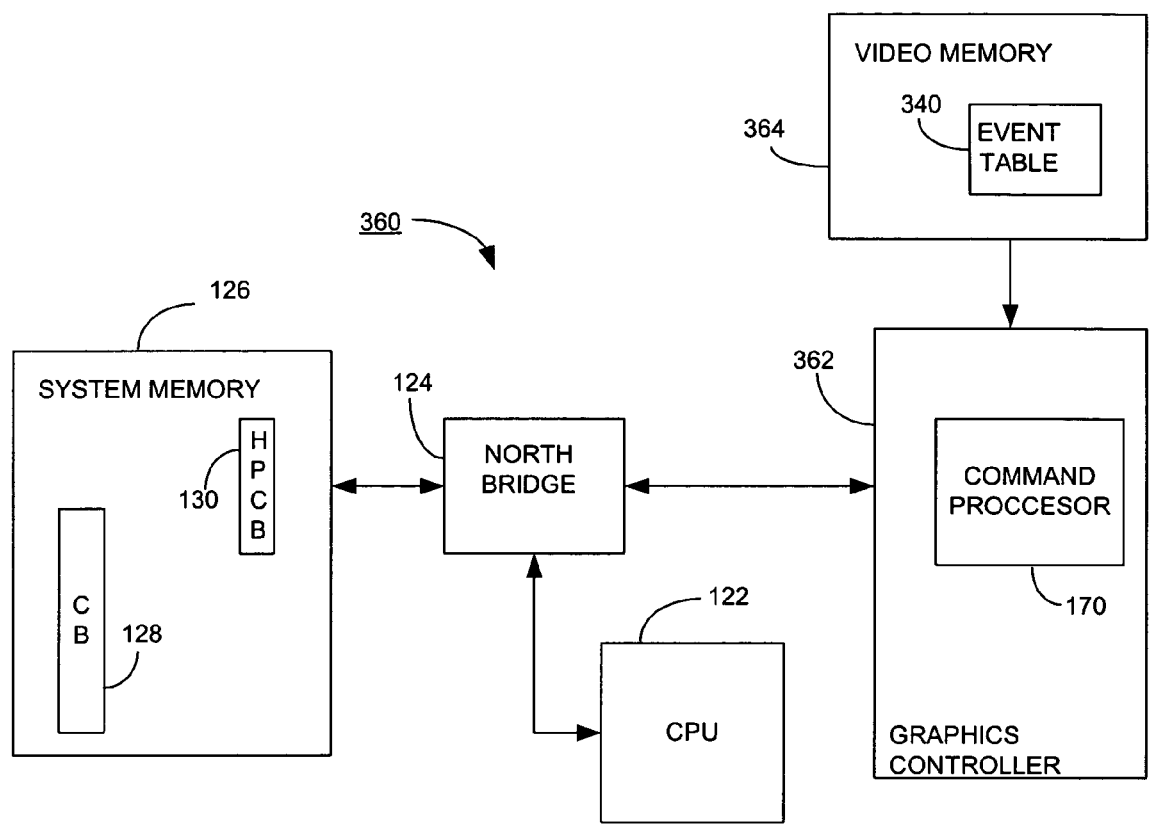
FIG. 8 illustrates a schematic block diagram of the processing system, in accordance with one embodiment of the present invention.

FIG. 8 illustrates a block diagram of a processing system in accordance with an embodiment of the present invention. The processing system 360 has a CPU 122 that provides processing information to a north bridge 124. Similar to the prior art system of FIG. 2, the north bridge then accesses a system memory 126 having multiple command buffers, a high priority command buffer 130 and a standard command buffer (or low priority) 128. The north bridge 124, upon receiving a command from the CPU 122, accesses the system memory 126 and thereupon provides the command from command buffer, 128 or 130, to the graphics controller 362. The graphics controller 362 contains a command processor 170. In an embodiment of the present invention, the graphics controller 362 is also operably coupled to a video memory 364 having an event table 340 stored therein.

A real-time event detector within the graphics controller 362 is provided with the event selector 342, command buffer pointer 344, and length of command buffer 346 information from the event table 340 within the video memory 364. The real-time event detector then monitors for the occurrence of a real-time event, through the comparison of event signals. Similar to the system of FIG. 4, when a real-time event is detected, the graphics controller 362 thereupon accesses a real-time event command buffer so as to fetch and consume real-time event commands within the command processor 170 therein.

The present invention provides for improved processing efficiency by allowing for the processing and subsequent execution of a plurality of command upon the occurrence of a specific event, i.e. real time event. The present invention reduces any latency problems associated with multiple priority buffers by designating a plurality of commands to be processed upon the occurrence of the real time event. The monitoring of event signals to detect a real time event, and subsequent accessing of the real time event command buffer, providing the real time event commands contained therein to be consumed by the command processor, allows for improved efficiency and the command processor to execute a plurality of commands upon the occurrence of the real time event, regardless of the number of commands currently within the system command buffer(s).

It should be understood that the implementation of other variations and modifications of the invention in its various aspects as may be readily apparent to those of ordinary skill in the art, and that the invention is not limited by the specific embodiment described herein. For example, the video memory may be a local ROM or RAM storage area. Another example, the real time event command buffer may contain a specific real time event command to direct the fetcher to automatically fetch a number of real time event commands from a second real time event command buffer upon the consumption of all the commands in the first real time event command buffer without reprogramming the real time event detector to detect the triggering real time event. It is therefore contemplated to cover by the present invention any and all modifications, variations, or equivalents that fall within the spirit and scope of the basic underlying principles disclosed and claimed herein.

What is claimed is:

1. A method for processing command information in a command processing system, the method comprising:
   (a) detecting a real time event while monitoring a plurality of event signals, wherein the plurality of event signals are generated by a plurality of engines and one of the plurality of engines is a 3D engine:
   (b) causing commands in a real time event command buffer to be fetched and consumed in response to the real time event; and
   wherein step (a) further comprises:
      (a1) providing event selector signal to a comparator;
      (a2) providing the plurality of event signals to the comparator; and
      (a3) generating an event detection signal when at least one of the event signals is equivalent to the event selector signal.

2. The method of claim 1 wherein step (b) further comprises providing the commands in the real time event command buffer to be processed by a command processor.

3. The method of claim 1 wherein the real time event includes a system command from a system command buffer processed by a command processor, the method further comprising:
   (c) first consuming all of the commands within the real time event command buffer; and
   (d) in response to processing all of the commands of the real time event command buffer, processing a next system command within the system command buffer.

4. The method of claim 1 further comprising:
   (c) detecting a second real time event; and
   (d) causing commands in a second real time command buffer to be fetched and consumed in response to detecting the second real time event.

5. A method for processing command information, the method comprising:
   (a) providing system commands to a command processor from a system command buffer;
   (b) detecting a real time event while monitoring a plurality of event signals, wherein the plurality of event signals are generated by a plurality of engines and one of the plurality of engines is a 3D engine;
   (c) fetching real time event commands in a real time event command buffer in response to the real time event;
   (d) providing the real time event commands in the real time event command buffer to the command processor and
   (e) consuming the real time event commands by the command processor; and
   wherein step (b) further comprises:
      (b1) providing an event selector signal to a comparator;
      (b2) providing the plurality of event signals to the comparator; and
      (b3) generating an event detection signal when at least one of the event signals is equivalent to the event selector signal.

6. The method of claim 5 further comprising:
   (a1) fetching the system commands from the system command buffer;
   (b4) in response to detecting a real time event, pausing the fetching of the system commands; and
   (c1) upon the processing of all the real time event commands in the real time event command buffer, resuming the fetching of system commands from the system command buffer.

7. The method of claim 5 further comprising:
   (f) detecting a second real time event;
   (g) fetch commands in a second real time event command buffer;
   (h) providing the commands of the second real time event command buffer to the system processor; and
   (i) consuming the second real time event commands by the system processor.

8. A method for processing command information, the method comprising:
   (a) loading real time event into a real time event detector;
   (b) providing a system command from a system command buffer to a command processor;
   (c) detecting a real time event while monitoring a plurality of event signals, wherein the plurality of event signals are generated by a plurality of engines and one of the plurality of engines is a 3D engine;
   (d) fetching real time event commands in the real time event command buffer:
   (e) providing the real time event commands of the real time event command buffer to the command processor; and
   (f) consuming the real time event commands by the command processor; and
   wherein the step (c) further comprises:
      (c1) providing an event selector signal to a comparator;
      (c2) providing the plurality of event signals to the comparator; and
      (c3) generating an event detection signal when an event signal is equivalent to the event selector signal.

9. The method of claim 8 further comprising:
   (g) loading a second real time event into the real time event detector.

10. An apparatus for processing command information, the apparatus comprising:
- a command processor for processing system commands from a system command buffer;
- a first real time event engine which monitors a plurality of event signals for a real time event;
- a real time event command buffer, containing a plurality of real time event commands, operably coupled to the first real time event engine; and
- a plurality of engines providing the plurality of event signals, wherein one of the engines is a 3D engine;
- wherein when the real time event occurs, the real time event commands are fetched and consumed by the command processor;
- wherein the first real time event engine comprises a real time event detector comprising an event table containing an event selector; a comparator operative to receive the event selector;
- wherein the plurality of engines provide the plurality of event signals to the comparator; and
- wherein the comparator compares the plurality of event signals to the event selector and produces an event detection signal when at least one of the plurality of event signals matches the event selector.

11. The apparatus of claim 10 wherein the event table further contains a command buffer pointer and a length of command buffer field wherein the command buffer pointer points to a command buffer and the length of command buffer field provides the number of commands within the command buffer.

12. The apparatus of claim 10 wherein the event table is stored in a local command processor memory.

13. The apparatus of claim 10 further comprising a real time event controller which programs the real time event detector with the real time event selector for the detection of the real time event.

14. The apparatus of claim 10 further comprising:
- a second real time event engine which monitors the commands provided to the command processor for a second real time event; and
- a second real time event command buffer, containing a plurality of second real time event commands, operably coupled to the second real time event engine, wherein when the second real time event occurs, the second real time commands are fetched and consumed by the command processor.

15. An apparatus for processing command information, the apparatus comprising:
- a command processor for processing system commands from a system command buffer;
- a first real time event engine which monitors a plurality of event signals for a first real time event;
- a plurality of engines providing the plurality of event signals, wherein one of the plurality of engines is a 3D engine;
- a first real time event command buffer, containing a plurality of first real time event commands, operably coupled to the first real time event engine, wherein when the first real time event occurs, the processing of the system commands is paused and the first real time event commands are fetched and consumed by the command processor;
- a second real time event engine which monitors the plurality of event signals for a second real time event; and
- a second real time event command buffer, containing a plurality of second real time event commands, operably coupled to the second real time event engine, where in when the second real time event occurs, the processing of commands by the command processor is paused and the second real time event commands are fetched and consumed by the command processor;
- wherein the first real time event engine comprises a first real time event detector having a first event selector and a first comparator which receives the first event selector;
- wherein the second real time event engine comprises a second real time event detector having a second event selector and a second comparator which receives the second event selector; and
- wherein the plurality of engines is operably coupled to the first comparator and the second comparator, whereupon when one of the event signals matches the first event selector, a first event detection signal is produced by the first comparator and when one of the event signals matches the second event selector, a second event detection signal is produced by the second comparator.

16. A graphics controller comprising:
- a command processor for processing system commands from a system command buffer;
- a first real time event engine which monitors a plurality of event signals for a first real time event;
- a plurality of engines providing the plurality of event signals, wherein one of the plurality of engines is a 3D engine; and
- a first real time event command buffer, containing a plurality of first real time event commands, operably coupled to the first real time event engine, wherein when the first real time event occurs, the processing of the system commands is paused and the first real time event commands are fetched and consumed by the command processor;
- wherein the first real time event engine comprises a real time event detector comprising an event table containing an event selector; a comparator operative to receive the event selector;
- wherein the plurality of engines provide the plurality of event signals to the comparator; and
- wherein the comparator compares the plurality of event signals to the event selector and produces an event detection signal when at least one of the plurality of event signals matches the event selector.

17. The graphics controller of claim 16 further comprising:
- a second real time event engine which monitors the plurality of event signals for a second real time event;
- a second real time event command buffer, containing a plurality of second real time event commands, operably coupled to the second real time event engine, wherein when the second real time event occurs, the processing of commands by the command processor is paused and the second real time event commands are fetched and consumed by the command processor.

18. The graphics controller of claim 17 wherein the second real time event of the second real time event engine is programmed by the first real time event engine.

19. An apparatus for processing command information, the apparatus comprising:
- means for processing system commands from a system command buffer; first means for monitoring a plurality of event signals for a first real time event;
- a plurality of means for providing the plurality of event signals, wherein one of the plurality of means is a 3D engine;
- a first means for containing a plurality of first real time event commands, operably coupled to the first means to monitoring, wherein when the first real time event occurs, the processing of the commands by the means for processing system commands is paused and the first real time event commands are fetched and consumed by the means for processing system commands;

a second means for monitoring the plurality of event signals for a second real time event; and a second means for containing a plurality of second real time event commands, operably coupled to the second means for monitoring, wherein when the second real time event occurs, the processing of commands by the means for processing system commands is paused and the second real time event commands are fetched and consumed by the means for processing system command;

wherein the first monitoring means comprises a means having a first event selector and a first means for receiving the first event selector;

wherein the second monitoring means comprises a means having a second event selector and a second means for receiving the second event selector; and wherein the plurality means are operably coupled to the first means for receiving and the second means for receiving, whereupon when one of the event signals matches the first event selector, a first event detection signal is produced by the first means for receiving and when one of the event signals matches the second event selector, a second event detection signal is produced by the second means for receiving.

* * * * *

UNITED STATES PATENT AND TRADEMARK OFFICE
CERTIFICATE OF CORRECTION

| | | |
|---|---|---|
| PATENT NO. | : 7,735,093 B2 | Page 1 of 1 |
| APPLICATION NO. | : 10/791519 | |
| DATED | : June 8, 2010 | |
| INVENTOR(S) | : Gruber et al. | |

It is certified that error appears in the above-identified patent and that said Letters Patent is hereby corrected as shown below:

Column 10, line 17, claim 5: "processor and" to read as --processor; and--

Column 10, line 49, claim 8: "a real time event" to read as --the real time event--

Column 10, line 54, claim 8: "buffer:" to read as --buffer;--

Column 11, line 67, claim 15: "where in" to read as --wherein--

Signed and Sealed this
Twelfth Day of July, 2011

David J. Kappos
*Director of the United States Patent and Trademark Office*